United States Patent [19]
Laffont

[11] Patent Number: 5,780,932
[45] Date of Patent: Jul. 14, 1998

[54] ELECTRICITY GENERATING UNIT HAVING A COMBINED CYCLE AND INCLUDING A GAS TURBINE AND A STEAM TURBINE HAVING A PLURALITY OF MODULES

[75] Inventor: Patrick Laffont, Montrouge, France

[73] Assignee: GEC Alsthom Electromecanique SA, Montrouge, France

[21] Appl. No.: 574,587

[22] PCT Filed: Apr. 28, 1995

[86] PCT No.: PCT/FR95/00561

§ 371 Date: Dec. 14, 1995

§ 102(e) Date: Dec. 14, 1995

[87] PCT Pub. No.: WO95/30078

PCT Pub. Date: Nov. 9, 1995

[30] Foreign Application Priority Data

May 3, 1994 [FR] France ............... 95 05 389

[51] Int. Cl.⁶ .............. F01D 15/10; F02C 6/00; H02K 7/18; H02D 9/04
[52] U.S. Cl. .............. 290/52; 290/2; 290/4 C; 290/4 D; 290/4 R; 60/39.31; 60/39.182; 415/213.1
[58] Field of Search ............... 290/52, 2, 4 R, 290/4 C, 4 D; 60/39.31, 39.182; 415/213.1

[56] References Cited

U.S. PATENT DOCUMENTS 5,271,217  12/1993  Knuijt ............... 60/39.182

FOREIGN PATENT DOCUMENTS

0407132A1  1/1991  European Pat. Off. .
0613996A1  9/1994  European Pat. Off. .
1338871    8/1963  France .

OTHER PUBLICATIONS

*Patent Abstracts Of Japan*, vol. 7, No. 169 (M-231) 91314), 26 Jul. 1983 corresponding to JP. A. 58 074809 (Mitsubishi) dated May 6, 1983.

*Primary Examiner*—Steven L. Stephan
*Assistant Examiner*—Elvin G. Enad
*Attorney, Agent, or Firm*—Sughrue, Mion, Zinn, Macpeak & Seas, PLLC

[57] ABSTRACT

An electricity generating unit having a combined cycle, and comprising, mounted in succession along a common line of shafts via rigid couplings (28, 29, 31), a gas turbine (6), a steam turbine having a plurality of modules (1, 2), and an electricity generator (11), the gas turbine (6) being mounted to move in axial translation, and fixed to a moving abutment (27), said electricity generating unit being characterized in that the stator portions of the gas turbine (6) and of the first module (1) of the steam turbine are connected together via at least two links (32), in that said links (32) and the ends of the rotors of the gas turbine (6), and of the first module (1) of the steam turbine are enclosed in an enclosure (33) filled with a heat-conducting fluid, and in that each of the facing ends of the stator portions of the last two modules (1, 2) of the steam turbine is connected to a respective fixed point (34, 35).

3 Claims, 2 Drawing Sheets

ELECTRICITY GENERATING UNIT HAVING A COMBINED CYCLE AND INCLUDING A GAS TURBINE AND A STEAM TURBINE HAVING A PLURALITY OF MODULES

FIELD OF THE INVENTION

The present invention relates to an electricity generating unit having a combined cycle, and comprising, mounted in succession along a common line of shafts via rigid couplings, the rotor of a gas turbine, the rotors of a steam turbine having a plurality of modules, and the rotor of an electricity generator, the gas turbine being mounted to move in axial translation, the line of shafts being provided with an abutment that is constrained to move in axial translation with the non-rotary portions of the gas turbine or of the first module of the steam turbine.

By associating two axial-flow turbo-machines on the same line of shafts, it is possible to reduce the dimensions of the machine room compared with a unit in which each turbo-machine drives its own electricity generator. Furthermore, only one alternator is needed.

Unfortunately, this results in very long lines of shafts, giving rise to considerable cumulative axial expansion of the various rotors, and making it necessary to provide large axial clearances in the flow-sections of the turbo-machines.

Such large axial clearances significantly affect the performance levels of the electricity generating unit.

BACKGROUND OF THE INVENTION

EP-A-0 407 132 relates to an electricity generating unit having a combined cycle and comprising, mounted in succession on a common line of shafts via rigid couplings, the rotor of a gas turbine, the rotors of a steam turbine having a plurality of modules, and the rotor of an electricity generator. The line of shafts is provided with an abutment secured to the fixed rear bearing of the gas turbine. The non-rotary portion of the gas turbine is mounted to move axially, the front of the non-rotary portion of the first module of the steam turbine is fixed to the foundations. In this way, the axial expansion is small between the gas turbine and the first module of the steam turbine, the non-rotary portion of the gas turbine expanding towards the front of the abutment like the associated portion of the line of shafts, and the non-rotary portion of the first module of the steam turbine expanding towards the rear of the abutment like the associated portion of the line of shafts.

One of the drawbacks of that configuration lies in the fact that the relative axial expansion between the rotary portions and the non-rotary portions of the turbines is poorly controlled, and this gives rise to relative axial displacement between the rotary portions and the non-rotary portions of the turbines, which displacement affects the performance levels of the electricity generating unit.

U.S. Pat. No. 5,271,217 relates to an electricity generating unit having a combined cycle and comprising, mounted in succession on a common line of shafts via rigid couplings, the rotor of a gas turbine, the rotors of a steam turbine, and the rotor of an electricity generator, the non-rotary portion of the gas turbine being mounted to move in axial translation, the non-rotary portion of the steam turbine being secured at both of its ends to the foundations. The non-rotary portions of the gas turbine and of the steam turbine are connected together via links. That configuration makes it possible to limit the relative axial displacement between the rotary portions and the non-rotary portions. However, it gives rise to other drawbacks, in particular the relative axial expansion between the links and the line of shafts, or the positions of the fixed points of the non-rotary portion of the steam turbine.

SUMMARY OF THE INVENTION

The present invention provides an electricity generating unit having a combined cycle, and comprising, from the front to the rear, mounted on foundations, a gas turbine followed by a steam turbine having at least one hot module and a cold module, followed by an electricity generator, the rotors of the gas turbine, of the steam turbine and of the electricity generator forming a common line of shafts via rigid couplings, the stator of the gas turbine being mounted to move in axial translation, the line of shafts being provided with an abutment constrained to move in axial translation with the rear stator portion of the stator of the gas turbine or with the front stator portion of the stator of the hot module of the steam turbine, the rear stator portion of the gas turbine and the front stator portion of the hot module of the steam turbine being connected together via at least two links.

According to the invention, the links, the rear end of the rotor of the gas turbine, and the front end of the rotor of the hot module of the steam turbine are enclosed in an enclosure filled with a heat-conducting fluid, and the rear stator portion of the stator of that module of the steam turbine which precedes the cold module thereof is connected to the foundations via a fixed point, the stator of the cold module being connected to the foundations via another fixed point.

By means of this disposition, the clearances in the flow-sections of the gas turbine and of the hot module of the steam turbine are almost the same as in an electricity generating unit having two lines of shafts, and the axial clearances in the flow-sections of the cold module of the steam turbine are slightly increased.

In a variant embodiment, the electricity generating unit includes a steam turbine having a warm module interposed between the cold module and the hot module, the front stator portion of the stator of the warm module and the rear stator portion of the stator of the hot module of the steam turbine being connected together via at least two links, and said links, the rear end of the rotor of the hot module, and the front end of the rotor of the warm module of the steam turbine are enclosed in an enclosure filled with a heat-conducting fluid.

In this way, the clearances in the flow-sections of the gas turbine and of the hot module of the steam turbine are still the same as in an electricity generating unit having a single line of shafts, and the axial clearances of the cold module and of the warm module of the steam turbine are slightly increased.

The enclosure may be a sheet metal casing containing lubricating oil for the adjacent bearings of the line of shafts.

BRIEF DESCRIPTION OF DRAWINGS

Other characteristics and advantages of the invention will appear on reading the following description of two embodiments of the invention given with reference to the accompanying drawings, in which.

DETAILED DESCRIPTION

In the following description, the "hot" module of the steam turbine corresponds to a module of the HP or HP/MP type or of an equivalent type; the "warm" module of the steam turbine corresponds to a module of the district-heating type or of an equivalent type; and the "cold" module of the steam turbine corresponds to an LP type module.

Figure 1:
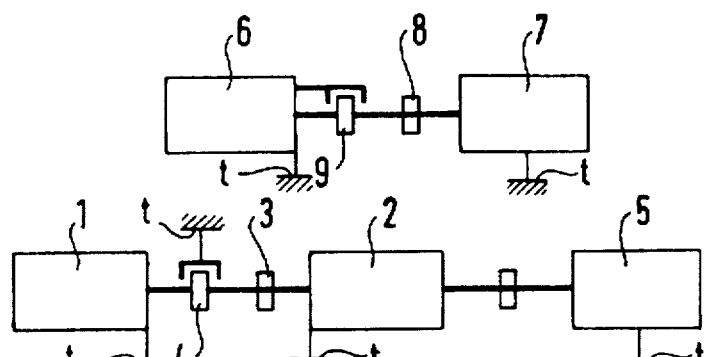
FIGS. 1 to 5 are diagrams showing known types of electricity generating units.

FIG. 1 shows an electricity generating unit that associates a gas turbine and a steam turbine. Such an association constitutes a power station having a combined cycle that may be implemented in various ways.

In the unit shown in FIG. 1, two separate lines of shafts are used, with each turbo-machine driving its own electrical generator such as an alternator. The steam turbine generally comprises a plurality of modules such as a hot module 1 and a cold module 2 whose rotary portions or rotors are assembled together via a rigid coupling 3 with a fixed abutment 4, the modules driving a first alternator 5. The gas turbine 6 drives a second alternator 7 to which it is connected via a rigid coupling 8 with a fixed abutment 9. In the drawings, the symbol referenced "t" designates a (fixed point) connection between the non-rotary portions of a machine and the concrete foundations on which the machines are placed. The letter t may also designate a connection between a fixed abutment and the concrete foundations.

Figure 2:
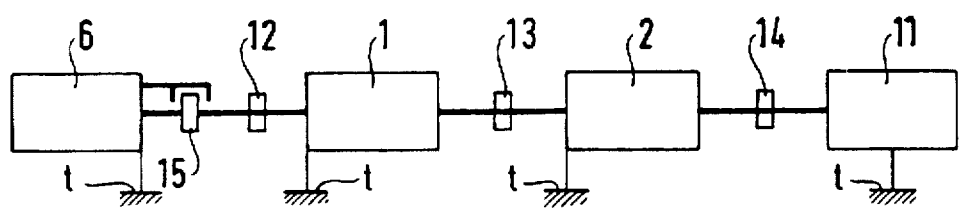

A unit such as the one shown in FIG. 1 requires a large machine room and two separate electricity generators. Therefore, units have been designed that have single lines of shafts. Such a unit having a single line of shafts is shown diagrammatically in FIG. 2, the various machines, namely the gas turbine 6, the hot module 1, the cold module 2, and the alternator 11 being mounted in succession along the same line of shafts from the front (situated on the left of the figure) to the rear (on the right of the figure); the rotors are assembled together via rigid couplings 12, 13, and 14, an abutment 15 being constrained to move in axial translation with the stator portion of the gas turbine 6. The stator of the gas turbine is fixed to the concrete foundations; the connection t is situated at the rear of the module.

Using a single line of shafts means that such lines have to be very long; expansion of the rotors is excessive and it is necessary to provide large axial clearances in the flow-sections of the two turbo-machines, thereby reducing efficiency because of the offsets between the nozzles and the blades.

Figure 3:
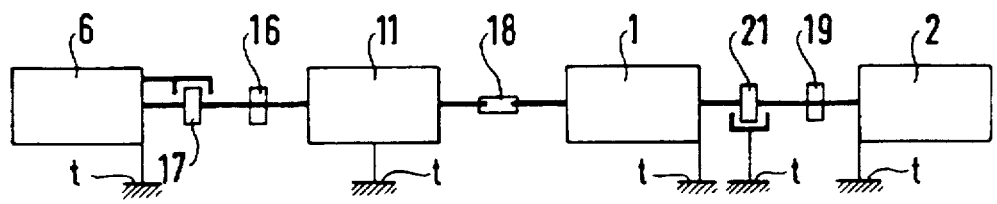

Another unit is shown diagrammatically in FIG. 3; the alternator 11 is disposed between the gas turbine 6 and the hot module 1 of the steam turbine; the rotor of the alternator 11 is secured both to the rotor of the gas turbine 6 via a rigid coupling 16 and also to the rotor of the hot module 1 of the steam turbine via a flexible coupling 18; the rotors of the alternator and of the gas turbine are positioned axially by the internal abutment 17 of the gas turbine. The stator of the gas turbine is fixed to the concrete foundations via a connection t that is situated at the rear of the gas turbine; the rotors of the two modules 1 and 2 of the steam turbine are assembled together via a rigid coupling 19, with an abutment 21 that is fixed relative to the concrete foundations, and that is secured to the rotor of the hot module 1.

That disposition makes it possible to reduce the axial clearances in the flow-sections of the two turbo-machines, but it poses a problem with respect to maintenance of the electricity generator, in particular regarding removing the rotor of the alternator.

Figure 4:
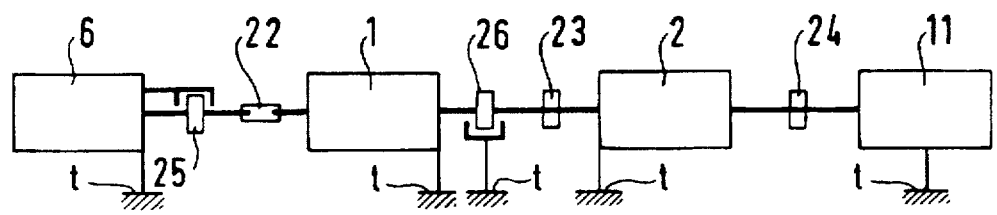

The unit shown diagrammatically in FIG. 4 uses two abutments, and a flexible coupling 22 between the gas turbine 6 and the hot module 1; the other machines are assembled together via respective rigid couplings 23, 24. A first abutment 25 is connected to the stator of the gas turbine 6, and a second abutment 26, which is fixed relative to the concrete foundations, is provided between the two modules 1 and 2 of the steam turbine; the second abutment corresponds to abutment 21 in FIG. 3.

In that unit, the flexible coupling 22 has to withstand high transient and permanent torque when the power of the gas turbine is high (e.g. greater than 200 MW), and the power of that unit is therefore limited.

Figure 5:
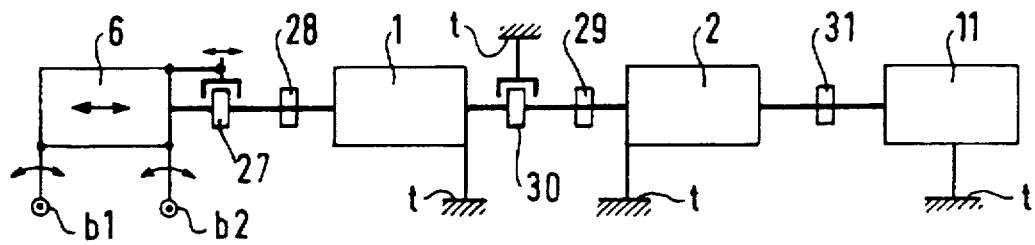

Another possibility is shown diagrammatically in FIG. 5: the gas turbine 6 is mounted on hinged links b1, b2 enabling the non-rotary portions to be displaced axially; furthermore, via the internal abutment 27 of the gas turbine, which abutment is secured to the stator, the rotor of said gas turbine is displaced axially with the module; all of the rotors of the machines, namely the gas turbine 6, the two modules 1 and 2 of the steam turbine, and the alternator 11 are mounted in succession from the front to the rear by means of rigid couplings 28, 29, and 31, and a fixed abutment 32 is secured to the shaft of the hot module 1 in a manner analogous to the manner in which the fixed abutment 21 shown in FIG. 3 is secured.

That unit suffers from the drawback that the forces on the abutments are ill-defined, and they may reach unacceptable values. The moving abutment 27 axially positions the gas turbine (rotor and stator) whose mass may be as much as 400 metric tons; the fixed abutment 30 axially positions the gas turbine and the entire line of shafts. These large masses may cause the two abutments to be subjected to destructive forces, e.g. during an earthquake.

An object of the present invention is to provide an electricity generating unit having a combined cycle and a single line of shafts, and provided with simple and robust means making it possible to limit the axial clearances in the flow-sections of the two turbo-machines, thereby obtaining good efficiency.

Figure 6:
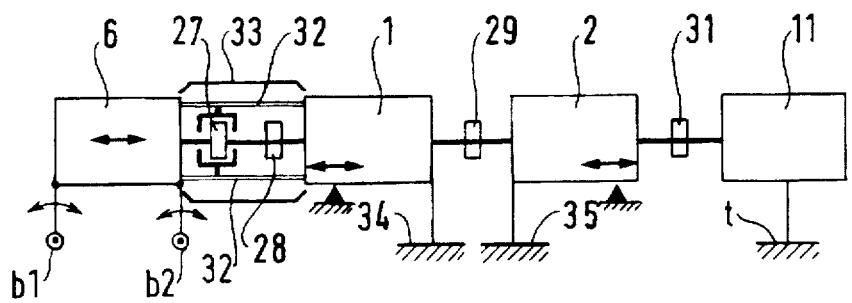
FIG. 6 is a diagram showing a generating unit of the invention, comprising a gas turbine and a steam turbine having two modules.

A first embodiment is shown diagrammatically in FIG. 6; the succession of machines is identical to that shown in FIG. 5; the rotors are also assembled together by means of rigid couplings 28, 29, and 31. The stator of the gas turbine 6 is mounted to move in axial translation. The line of shafts is provided with an abutment 27 constrained to move in axial translation with the rear stator portion of the stator of the gas turbine. The rear stator portion of the gas turbine 6 and the front stator portion of the hot module 1 of the steam turbine are connected together via links 32 uniformly disposed around the shafts of the two machines; there are at least two such links 32 diametrically opposite from each other relative to the line of shafts. The constrained abutment 27 is therefore secured to the gas turbine and to the hot module of the steam turbine.

In accordance with the invention, the links 32, the rear end of the rotor of the gas turbine 6, and the front end of the rotor of the hot module 1 of the steam turbine are enclosed in an enclosure 33 filled with a heat-conducting fluid.

In this way, it is possible to limit the temperature of the various elements to a value that is low and uniform between the links and the ends of the rotors, e.g. 60° C., thereby enabling both their own expansion and differential expansion to be limited. This is particularly important for links which may be as much as 3 meters to 4 meters long.

Furthermore, the rear stator portion of the stator of the hot module 1 of the steam turbine, which module precedes the cold module 2 of the steam turbine, is connected to the foundations via a fixed point 34, the stator of the cold module 2 being connected to the foundations via another fixed point 35.

Figure 7:
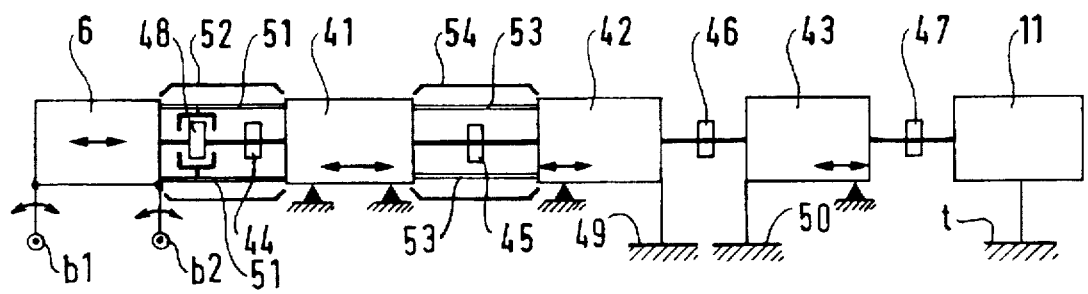
FIG. 7 is a diagram showing a generating unit of the invention, comprising a gas turbine and a steam turbine having three modules.

FIG. 7 shows a second embodiment of the invention in which the steam turbine comprises three modules, e.g. a hot module 41, a warm module 42, and a cold module 43, assembled together in succession from the front to the rear of the line of shafts. All of the rotors of the machines are assembled together by means of rigid couplings 44 to 47; the line of shafts is provided with an abutment 48 that is constrained to move in axial translation with the rear stator portion of the stator of the gas turbine. The rear stator portion of the gas turbine 6 and the front stator portion of the hot module 41 of the steam turbine are connected together via links 51 disposed uniformly around the shafts of the two machines; there are at least two such links 52 diametrically opposite from each other relative to the line of shafts. The constrained abutment 48 is therefore secured to the gas turbine and to the hot module 41 of the steam turbine.

In accordance with the invention, the links 51, the rear end of the rotor of the gas turbine 6, and the front end of the rotor of the hot module 41 of the steam turbine are enclosed in an enclosure 52 filled with a heat-conducting fluid. The rear stator portion of the stator of the warm module 42 of the steam turbine, which module precedes the cold module 43 of the steam turbine is connected to the foundations via a fixed point 49, the stator of the cold module 43 being connected to the foundations via another fixed point 50.

In this variant second embodiment, the front stator portion of the stator of the warm module 42 and the rear stator portion of the stator of the hot module 41 of the steam turbine are connected together via links 53. The rear end of the rotor of the hot module 41 and the front end of the rotor of the warm module 42 of the steam turbine are enclosed in an enclosure 54 filled with a heat-conducting fluid.

Regardless of the embodiment, the location of the fixed point 35, 50 of the cold module 2 is chosen as a function of the cold module used, and of the connection between it and the condenser. When the cold module is of the single-flow type, the fixed point is advantageously located on the front portion of the stator of the cold module. When the cold module is of the double-flow type, the fixed point is more advantageously located in the middle of the stator of the cold module.

Furthermore, it is possible to secure the moving abutment 27, 48 to the front stator portion of the stator of the hot module 1 instead of securing it to the rear stator portion of the stator of the gas turbine.

Figure 8:
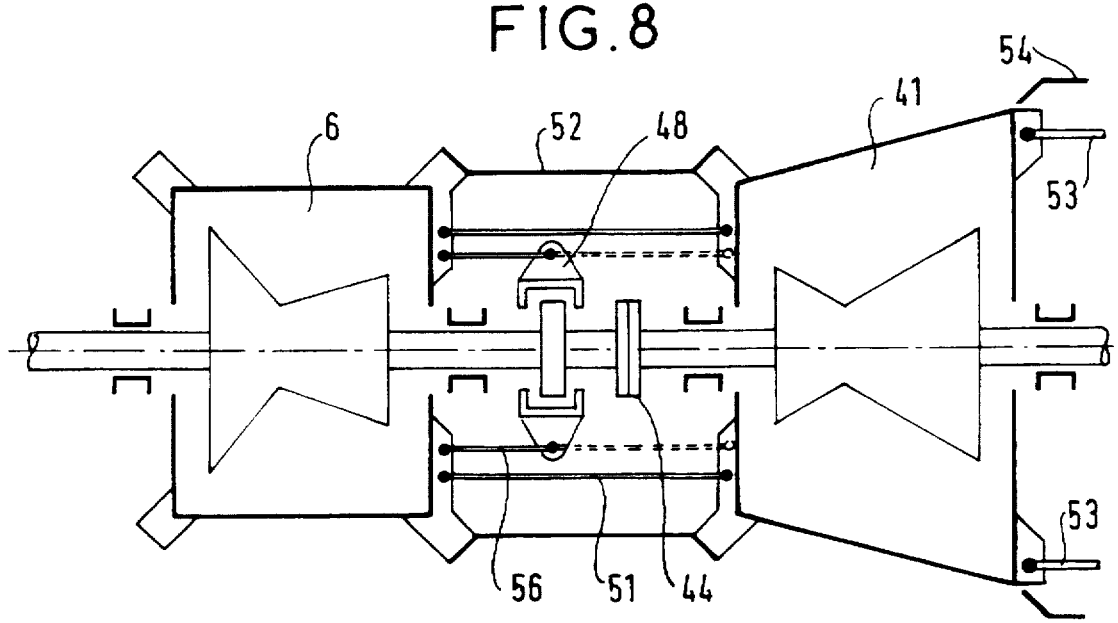
FIG. 8 is a diagram showing an enlarged view of a portion of FIG. 7.

FIG. 8 is a diagram showing, in more detail, the connection between the gas turbine 6 and the hot module 41. FIG. 8 shows the rigid coupling 44 between the two shafts of the machines, and the two links 51 hinged at each of their ends to respective pins that extend perpendicularly to the radial direction, the two links being secured to the stators of the gas turbine and of the hot module of the steam turbine. The casing constituting the enclosure 52 is also fixed to the stators.

The moving abutment 48 is secured to the stator of module 6 via links 56 that are similar to links 51. The casing 52 is a sheet metal casing inside which lubricating oil is sprayed over the entire assembly, namely the links 51 and 56, the shafts of the two modules, the moving abutment 48 and the rigid coupling 44. In this way, the temperature of the various elements can be limited to a value that is low and uniform between the links and the ends of the rotors, e.g. 60° C., thereby making it possible to limit both their own expansion and differential expansion. This is particularly important for links which may be as much as 3 meters to 4 meters long.

Using links to assemble together the gas turbine and the hot module of the steam turbine, and optionally the hot module and the warm module of the steam turbine, makes it possible to reduce considerably the axial clearances in the flow-sections of the two machines. With respect to FIG. 6, with the expansion references being taken relative to the concrete foundations which is the absolute point of reference, and assuming firstly that the stator of the hot module 1 expands by 20 mm, and secondly that the rotor of the hot module 1 expands by 22 mm, corresponding to the distance between the elements referenced 27 and 29 being lengthened by 22 mm, then:

- the stator of the gas turbine 6 is pushed by the hot module 1 by means of the links 32 by 20 mm leftwards because the fixed point of the stator of the hot module 1 is situated at the rear of the stator, and therefore all of the expansion of the stator of the hot module is effected towards the front;
- this displacement causes all of the rotors to be displaced by 20 mm leftwards, since abutment 27 is secured to the gas turbine;
- since the rotor of the gas turbine is prevented from being displaced relative to the stator of the gas turbine, the axial clearances between the rotor and the stator of the gas turbine are identical to those of the installation shown in FIG. 1, i.e. they are optimal;
- likewise since the rotor of the hot module 1 is positioned by the moving abutment 27, it is prevented from being displaced relative to the front stator portion of the hot module 1, and therefore the axial clearances in the hot module 1 are optimal;
- the coupling 29 is displaced relative to the concrete by −20 mm+20 mm=2 mm; and
- the rotor of the cold module 2 is therefore displaced at the coupling 29 by 2 mm; the clearances of the flow-sections of the cold module 2 need only be increased by 2 mm compared with an ideal installation for which the coupling 29 is not displaced relative to the concrete foundations.

To conclude, it can be said that, in the installation shown in FIG. 6, a portion of the thermal lengthening of the rotor of the hot module 1 is compensated by the expansion of the stator of said hot module. This is not true, for example, of the installation shown in FIG. 2 in which the coupling 13 is displaced by 22 mm rightwards relative to the concrete foundations.

I claim:

1. An electricity generating unit having a combined cycle, and comprising, from the front to the rear, mounted on foundations, a gas turbine (6) followed by a steam turbine having at least one hot module (1; 41) and a cold module (2; 43), followed by an electricity generator (11), the rotors of the gas turbine (6), of the steam turbine and of the electricity generator (11) forming a common line of shafts via rigid couplings (28, 29, 31; 44–47), the stator of the gas turbine (6) being mounted to move in axial translation, the line of shafts being provided with an abutment (27; 48) constrained to move in axial translation with the rear stator portion of the stator of the gas turbine or with the front stator portion of the stator of the hot module (1; 41) of the steam turbine, the rear stator portion of the gas turbine (6) and the front stator portion of the hot module (1; 41) of the steam turbine being connected together via at least two links (32; 51), said electricity generating unit being characterized in that said links (32, 51), the rear end of the rotor of the gas turbine (6), and the front end of the rotor of the hot module (1; 41) of the steam turbine are enclosed in an enclosure (33; 52) filled with a heat-conducting fluid, and in that the rear stator portion of the stator of that module (1, 42) of the steam turbine which precedes the cold module thereof is connected to the foundations via a fixed point, the stator of the cold module being connected to the foundations via another fixed point.

2. An electricity generating unit according to claim 1, including a steam turbine having a warm module (42) interposed between the cold module (43) and the hot module (41), said electricity generating unit being characterized in that the front stator portion of the stator of the warm module (42) and the rear stator portion of the stator of the hot module (41) of the steam turbine are connected together via at least two links (53), and in that said links (53), the rear end of the rotor of the hot module (41), and the front end of the rotor of the warm module (42) of the steam turbine are enclosed in an enclosure (54) filled with a heat-conducting fluid.

3. An electricity generating unit according to claim 1, characterized in that the enclosure (33, 52, 54) is a sheet metal casing containing lubricating oil for the adjacent bearings of the line of shafts.

* * * * *